US007210788B2

(12) United States Patent
Lee et al.

(10) Patent No.: US 7,210,788 B2
(45) Date of Patent: May 1, 2007

(54) COLOR PRISM AND PROJECTION-TYPE IMAGE DISPLAY APPARATUS EMPLOYING THE SAME

(75) Inventors: Kye-hoon Lee, Suwon-si (KR); Young-chol Lee, Gunpo-si (KR); Won-yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 11/153,502

(22) Filed: Jun. 16, 2005

(65) Prior Publication Data

US 2006/0044525 A1   Mar. 2, 2006

(30) Foreign Application Priority Data

Aug. 27, 2004   (KR) ............... 10-2004-0068034

(51) Int. Cl.
*G03B 21/26* (2006.01)
*G03B 21/28* (2006.01)
*G02B 27/28* (2006.01)
*G02B 27/14* (2006.01)
*G02B 27/12* (2006.01)
*G02B 5/04* (2006.01)
*H04N 5/74* (2006.01)
*H04N 9/69* (2006.01)
*G02F 1/00* (2006.01)
*G02F 1/1335* (2006.01)

(52) U.S. Cl. ............... 353/33; 353/34; 353/37; 353/81; 353/82; 353/84; 359/487; 359/634; 359/636; 359/638; 359/640; 359/834; 348/750; 348/757; 349/8; 349/9

(58) Field of Classification Search ........... 353/81, 353/20, 31, 33, 34, 37, 82, 98, 99; 359/487, 359/618, 629, 634, 636, 638–640, 833, 834; 349/5–9; 348/739, 742, 744, 750, 751, 757, 348/758, 771, 778, 780
See application file for complete search history.

(56) References Cited

U.S. PATENT DOCUMENTS

| 4,858,246 | A | 8/1989 | Wiggins |
| 5,223,983 | A | 6/1993 | Oono et al. |
| 6,464,360 | B2 * | 10/2002 | Hattori et al. ............... 353/33 |
| 6,604,828 | B2 * | 8/2003 | Lu ............... 353/33 |
| 6,626,539 | B2 | 9/2003 | van Gelder et al. |
| 6,665,122 | B1 * | 12/2003 | Yamagishi ............... 359/634 |
| 6,704,144 | B2 | 3/2004 | Huang |
| 2004/0160578 | A1 * | 8/2004 | Lu ............... 353/20 |
| 2004/0165155 | A1 * | 8/2004 | Lee et al. ............... 353/81 |

FOREIGN PATENT DOCUMENTS

KR    2003-54808 A    7/2003

* cited by examiner

*Primary Examiner*—W. B. Perkey
*Assistant Examiner*—Rochelle Blackman
(74) *Attorney, Agent, or Firm*—Stanzione & Kim, LLP

(57) ABSTRACT

A color prism capable of separating incident light into four color beams and synthesizing incident four-color beams, and a projection-type image display apparatus employing the color prism. The color prism includes: first through third triangular prisms each having two boundary surfaces which face the other two triangular prisms, and an outer surface which transmits or reflects incident light according to an incidence angle of the light; and first through third dichroic filters respectively interposed among the first through third triangular prisms and selectively transmits or reflects incident light according to wavelength so as to separate incident light into first through fourth light beams according to wavelength ranges and synthesize incident first through fourth light beams. The projection-type image display apparatus includes: a light source emitting light; a polarization beam splitter to transmit or reflect incident light according to a polarization direction; the color prism; first through fourth image forming devices disposed to face the outer surfaces of the first through third triangular prisms, and selectively modulates incident first through fourth light beams by pixels to form images and reflects the formed images to the color prism; and a projection lens unit to enlarge and project an incident image formed by the first through fourth image forming devices and synthesized by the color prism onto a screen.

20 Claims, 6 Drawing Sheets

COLOR PRISM AND PROJECTION-TYPE IMAGE DISPLAY APPARATUS EMPLOYING THE SAME

CROSS-REFERENCE TO RELATED APPLICATIONS

This application claims the priority of Korean Patent Application No. 2004-68034, filed on Aug. 27, 2004, in the Korean Intellectual Property Office, the disclosure of which is incorporated herein in its entirety by reference.

BACKGROUND OF THE INVENTION

1. Field of the Invention

The present general inventive concept relates to a color prism separating and synthesizing incident light according to wavelength ranges and a projection-type image display apparatus employing the color prism, and more particularly, to a color prism structured to separate incident light into four-color beams and to synthesize the incident four-color beams and a projection-type image display apparatus employing the color prism.

2. Description of the Related Art

In general, projection-type image display apparatuses create a color image by projecting an image, which has been formed by an image forming device, such as a liquid crystal display or a digital micromirror device, onto a screen using an illumination unit. Projection-type image display apparatuses are classified into a reflection type and a transmission type according to the type of an image forming device, and also classified into a single-panel type and a three-panel type according to the number of image forming devices used.

The present general inventive concept relates to a three-panel reflective projection-type image display apparatus. A projection-type image display apparatus is disclosed in U.S. Pat. No. 6,704,144, published on Mar. 9, 2004, entitled "a projection color separation prism assembly compensated for contrast enhancement and implemented as reflective imager."

The projection-type image display apparatus disclosed in U.S. Pat. No. 6,704,144 includes a prism assembly having three triangular prisms. The three triangular prisms are in contact with one another, and two contact surfaces of the three triangular prisms are coated with color separation filtering films. Three reflective liquid crystal on silicon (LCOS) displays are disposed to face two outer surfaces of the three triangular prisms.

Accordingly, white light emitted from a light source and incident on the prism assembly is separated according to wavelength into red, blue, and green beams after passing through the color separation filtering films. The separated beams are respectively incident on the three reflective LCOS displays. The three reflective LCOS displays respectively modulate the red, blue, and green beams by pixels to form images, and reflects the images to the prism assembly. The reflected images are synthesized, and then pass through a polarization beam splitter disposed between the light source and the prism assembly and travel toward a projection lens unit. Accordingly, the red, blue, and green beams are synthesized and projected onto a screen, thereby forming a full color image.

In the meantime, the projection-type image display apparatus forms the full color image using the LCOS displays. Hence, a color gamut is restricted to lie within a triangle shown in FIG. 1.

SUMMARY OF THE INVENTION

The present general inventive concept provides a color prism which separates incident light into four-color beams and synthesizes the beams to increase a color gamut.

The present general inventive concept also provides a projection-type image display apparatus which uses four reflective image forming devices to enhance light efficiency, increase a color gamut, and create a high quality color image.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a color prism comprising: first through third triangular prisms each having two boundary surfaces, which face the other two triangular prisms, and an outer surface, which transmits or reflects incident light according to an incidence angle of the light; and first through third dichroic filters respectively interposed among the first through third triangular prisms and selectively transmits or reflects incident light according to wavelength, so as to separate incident light into first through fourth light beams according to wavelength ranges and synthesize incident first through fourth light beams.

The foregoing and/or other aspects and advantages of the present general inventive concept are also achieved by providing a projection-type image display apparatus comprising: a light source emitting light; a polarization beam splitter to transmit or reflect incident light according to a polarization direction; a color prism including first through third triangular prisms each having two boundary surfaces, which face the other two triangular prisms, and an outer surface, which transmits or reflects incident light according to an incidence angle of the light, and first through third dichroic filters respectively interposed among the first through third triangular prisms and selectively transmits or reflects incident light according to wavelength, so as to separate incident light emitted from the light source and passing through the polarization beam splitter into first through fourth light beams according to wavelength ranges; first through fourth image forming devices disposed to face the outer surfaces of the first through third triangular prisms, and selectively modulates incident first through fourth light beams by pixels to form images and reflects the formed images to the color prism; and a projection lens unit to enlarge and project an incident image formed by the first through fourth image forming devices and synthesized by the color prism onto a screen.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
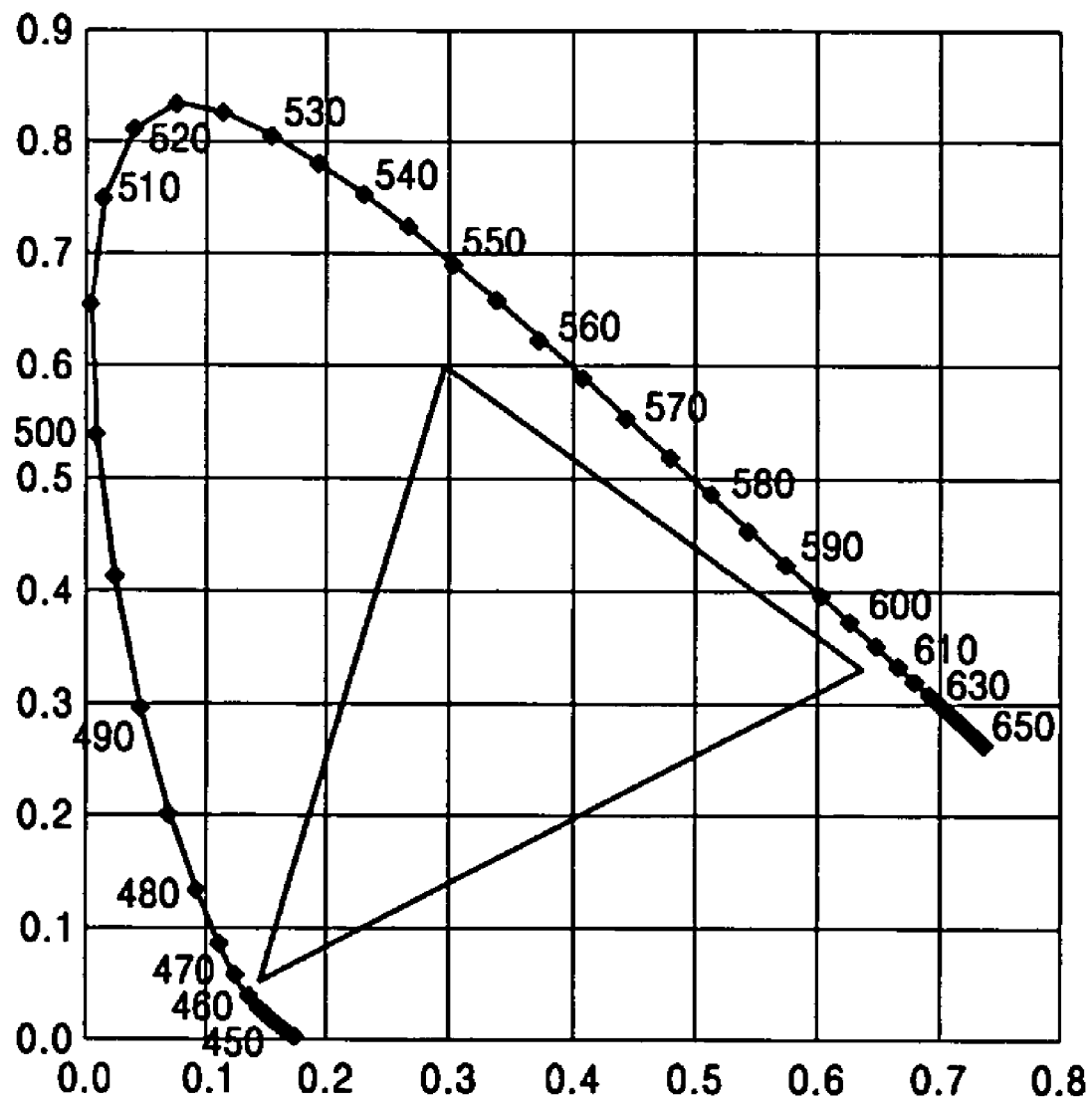
FIG. 1 is a graph illustrating a color gamut of light synthesized by a conventional prism assembly.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
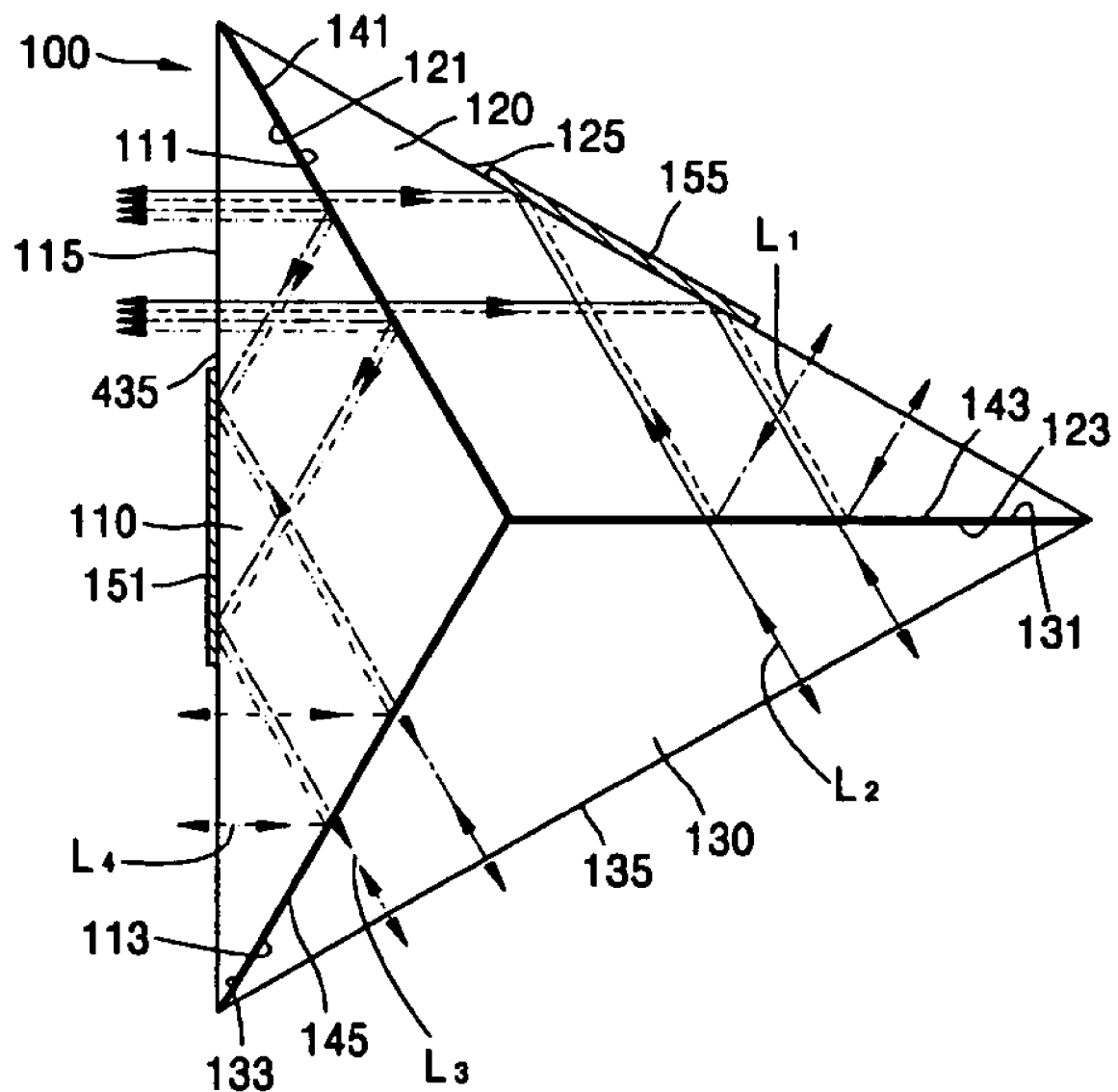
FIG. 2 is a schematic diagram of a color prism according to an embodiment of the present general inventive concept.

Referring to FIG. 2, a triangular color prism 100 according to an embodiment of the present invention includes first through third triangular prisms 110, 120, and 130, and first through third dichroic filters 141, 143, and 145. Each of the first through third triangular prisms 110, 120, and 130 has an outer surface, which transmits or totally reflects incident light according to an incidence angle of the light, and two boundary surfaces bonded to the other two triangular prisms. The first through third dichroic filters 141, 143, and 145 formed on the boundary surfaces among the first through third triangular prisms 110, 120, and 130 selectively transmit or reflect incident light according to wavelength. Accordingly, the color prism 100 can separate incident light into first through fourth light beams $L_1$, $L_2$, $L_3$, and $L_4$ according to wavelength ranges, and synthesize incident first through fourth light beams $L_1$, $L_2$, $L_3$, and $L_4$.

The first triangular prism 110 has first and second boundary surfaces 111 and 113, respectively, and a first outer surface 115 that transmits or reflects incident light according to a direction of the incident light. Here, a light beam substantially perpendicularly incident on the first outer surface 115 is transmitted through the first outer surface 115. In the meantime, light beams incident on the first outer surface 115 respectively from the first and second boundary surfaces 111 and 113 are totally internally reflected, and respectively travel to the second and first boundary surfaces 113 and 111. Such a total reflection occurs when a refractive index of the first triangular prism 110 is higher than the refractive index of a portion therearound and an incidence angle of light inside the first triangular prism 110 is greater than the critical angle.

The second triangular prism 120 has third and fourth boundary surfaces 121 and 123, respectively, and a second outer surface 125 that transmits or reflects incident light according to a direction of the incident light. The third boundary surface 121 faces the first boundary surface 111. Here, a light beam substantially perpendicularly incident on the second outer surface 125 is transmitted through the second outer surface 125. On the other side of the second triangular prism 120, light beams incident on the third and fourth boundary surfaces 121 and 123, respectively, at an angle greater than the critical angle, are totally internally reflected, and respectively travel to the fourth and third boundary surfaces 123 and 121.

The third triangular prism 130 has fifth and sixth boundary surfaces 131 and 133, and a third outer surface 135 that transmits incident light. Here, the fifth boundary surface 131 faces the fourth boundary surface 123, and the sixth boundary surface 133 faces the second boundary surface 113.

Here, it is illustrated that the first through third triangular prisms 110, 120, and 130 have the same shape and size. It is also illustrated that the first triangular prism 110 is an isosceles triangular prism having an angle of 120° between the first boundary surface 111 and the second boundary surface 113, an angle of 30° between the first boundary surface 111 and the first outer surface 115, and an angle of 30° between the second boundary surface 113 and the first outer surface 115. Likewise, the second and third triangular prisms 120 and 130 are illustrated as being isosceles triangular prisms having the same conditions as the first triangular prism 110.

The first through third dichroic filters 141, 143, and 145 are respectively disposed between the first and second triangular prisms 110 and 120, between the second and third triangular prisms 120 and 130, and between the first and third triangular prisms 110 and 130. Each of the first through third dichroic filters 141, 143, and 145 transmits light of a short wavelength and reflects light of a long wavelength on the basis of a predetermined wavelength.

Figure 3:
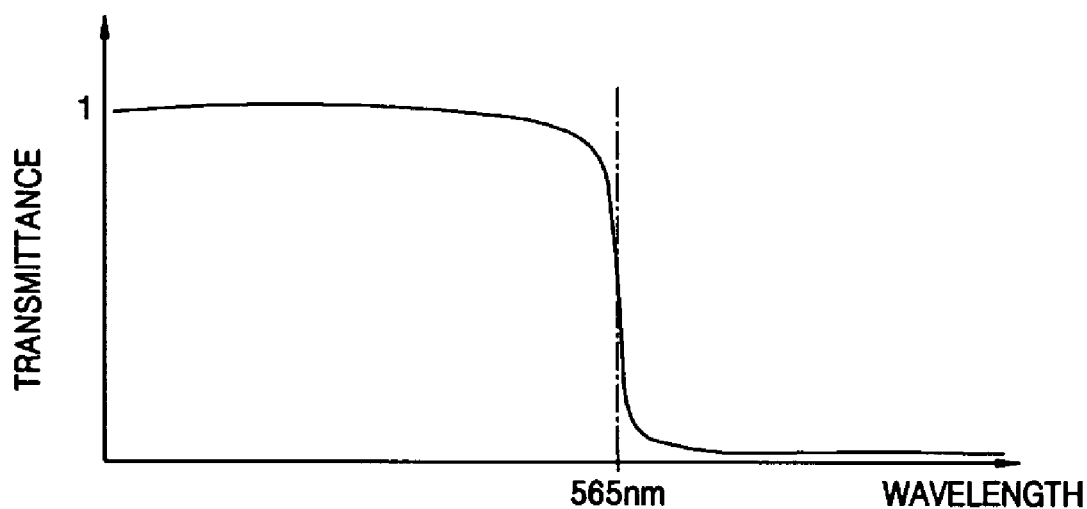
FIGS. 3 through 5 are graphs illustrating wavelength versus transmittance of first through third dichroic filters in the color prism shown in FIG. 2.
Figure 4:
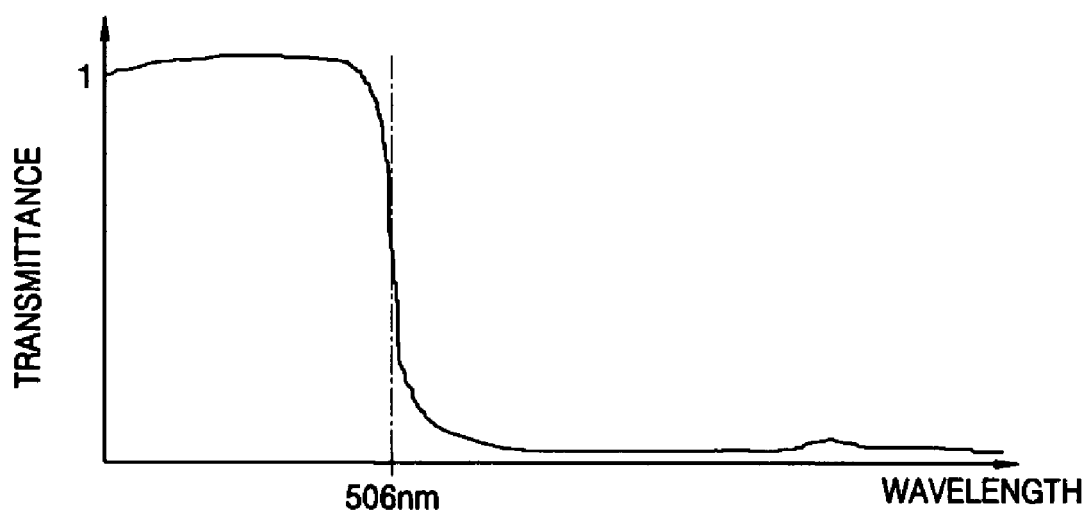
Figure 5:
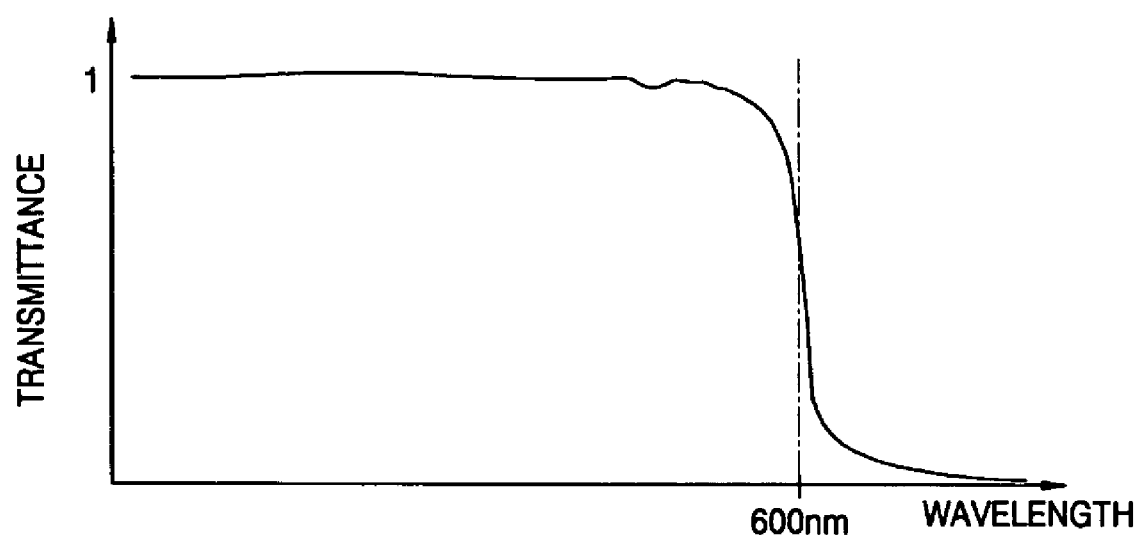

FIGS. 3 through 5 are graphs illustrating wavelength versus transmittance of the first through third dichroic filters 141, 143, and 145.

Referring to FIG. 3, the first dichroic filter 141 transmits light of a wavelength shorter than a specific wavelength, for example, 565 nm, and reflects light of a wavelength longer than 565 nm. Accordingly, when the first and second light beams $L_1$ and $L_2$ are respectively light beams of green and blue wavelengths, and the third and fourth light beam $L_3$ and $L_4$ are respectively light beams of yellow and red wavelengths, the first and second light beams $L_1$ and $L_2$ are transmitted through the first dichroic filter 141, and the third and fourth light beams $L_3$ and $L_4$ are reflected by the first dichroic filter 141. Accordingly, as shown in FIG. 2, if white light including the first through fourth light beams $L_1$, $L_2$, $L_3$, and $L_4$ are incident on the first outer surface 115 in the same path, the first and second light beams $L_1$ and $L_2$ are transmitted through the first outer surface 115 and travel to the second triangular prism 120, and the third and fourth light beams $L_3$ and $L_4$ are reflected by the first outer surface 115 and travel to the third triangular prism 130.

Referring to FIG. 4, the second dichroic filter 143 transmits light of a wavelength shorter than a specific wavelength, for example, 506 nm, and reflects light of a wavelength longer than 506 nm. Accordingly, the first light beam $L_1$ of the green wavelength is reflected by the second dichroic filter 143, and the second light beam $L_2$ of the blue wavelength is transmitted through the second dichroic filter 143.

Referring to FIG. 5, the third dichroic filter 145 transmits light of a wavelength shorter than a specific wavelength, for example, 600 nm, and reflects light of a wavelength longer than 600 nm. Accordingly, if the third and fourth light beams $L_3$ and $L_4$ are respectively light beams of yellow and red wavelengths, the third light beam $L_3$ is transmitted through the third dichroic filter 145, and the fourth light beam $L_4$ is reflected by the third dichroic filter 145.

Accordingly, the first through fourth light beams $L_1$ through $L_4$ can be divided and travel in different paths. Here, while the third light beam $L_3$ is the light beam of the yellow wavelength, it is not limited thereto but may be a light beam of a magenta wavelength.

Further, the color prism 100 according to the present embodiment (FIG. 2) may further include first and second reflective layers 151 and 155 considering total reflection properties of the first and second outer surfaces 115 and 125.

The first reflective layer 151, formed by covering a part of the first outer surface 115 with a total reflection coating, totally reflects third and fourth light beams $L_3$ and $L_4$, which are obliquely incident. In the meantime, since the first reflective layer 151 is not formed on a portion where light is perpendicularly incident on the first outer surface 115, the first reflective layer 151 does not affect the propagation of the perpendicularly incident light.

The second reflective layer 155, formed by covering a part of the second outer surface 125 with a total reflection coating, totally reflects first and second light beams $L_1$ and $L_2$, which are obliquely incident. In the meantime, since the second reflective layer 155 is not formed on a portion where light is perpendicularly incident on the second surface 125, the second reflective layer 155 does not affect the propagation of the perpendicularly incident light.

Since the integrated color prism constructed as above can separate incident light into four-color beams and synthesize four kinds of wavelengths incident from different locations, the color prism can increase a color gamut when being applied to a projection-type image display apparatus.

Figure 6:
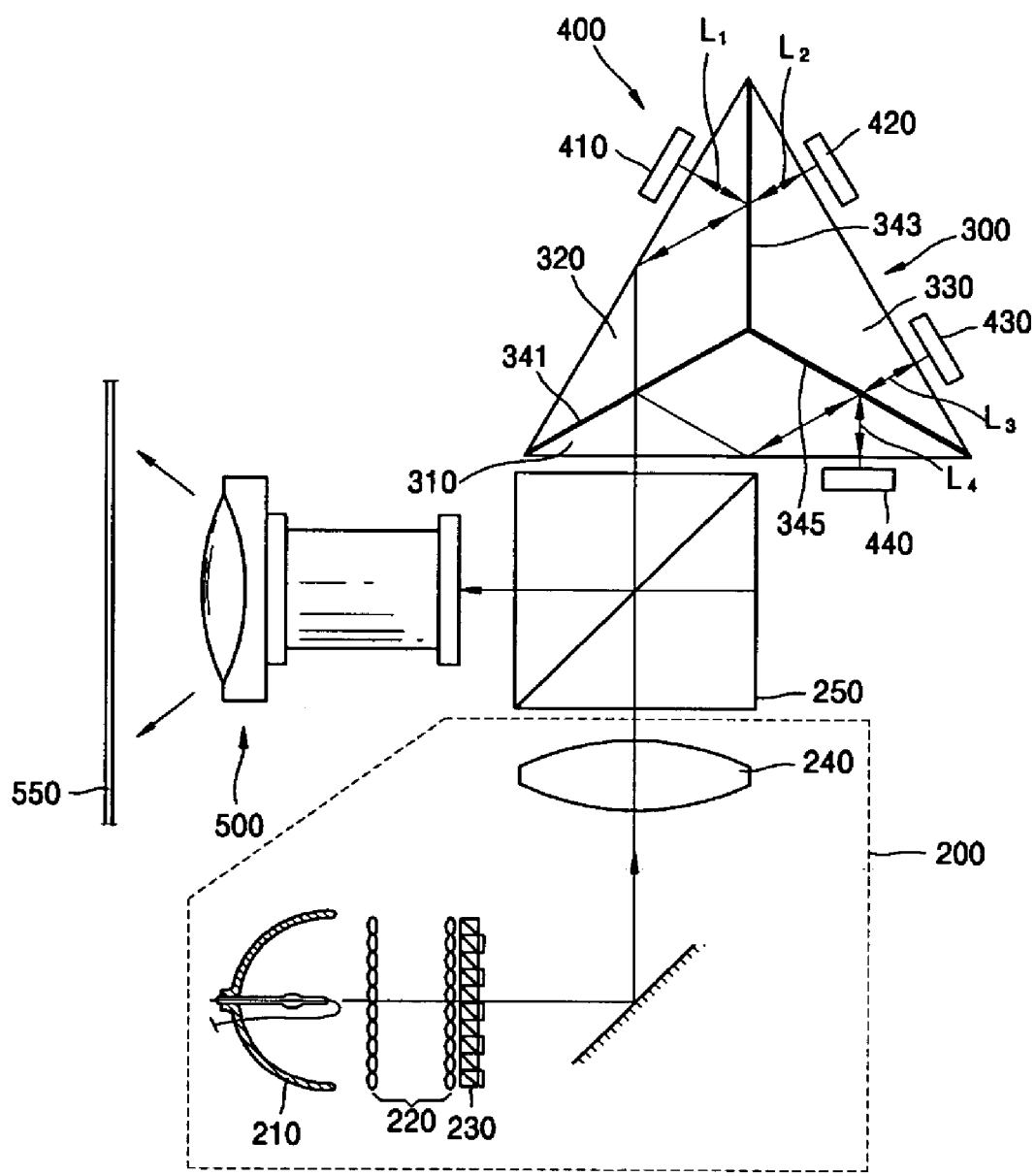
FIG. 6 is a diagram illustrating optical arrangement of a projection-type image display apparatus according to an embodiment of the present general inventive concept.

Referring to FIG. 6, a projection-type image display apparatus according to an embodiment of the present general inventive concept includes an illumination unit 200, a polarization beam splitter 250, which transmits or reflects incident light according to a polarization direction, a color prism 300, an image forming device 400, and a projection lens unit 500, which enlarges and projects an image formed by the image forming device 400 onto a screen 550.

The illumination unit 200 includes a light source 210 that emits white light. It is illustrated that the illumination unit 200 further includes a light integrator 220 interposed between the light source 210 and the polarization beam splitter 250 to emit uniform light having a predetermined polarization. The light integrator 220 may be a fly-eye lens array including one or more fly-eye lenses each having a plurality of convex or cylindrical lens cells that are arranged adjacent to one another.

In addition, it is illustrated that the illumination unit 200 further includes a polarization converting unit 230 interposed between the light source 210 and the polarization beam splitter 250 to change a polarization direction of incident light and direct light having a specific polarization to the polarization beam splitter 250. The polarization converting unit 230 includes a plurality of small polarization beam splitters and a quarter wave plate, and converts most of incident light into light with a specific polarization. Since the configuration of the polarization converting unit 230 is well known to one of ordinary skill in the art, a detailed explanation thereof will not be provided.

It is illustrated that the illumination unit 200 further includes a relay lens unit 240 interposed between the polarization converting unit 230 and the polarization beam splitter 250. The relay lens unit 240 includes one or more lenses, which relay uniform light emitted from the light source 210 and passing through the light integrator 220 to an image forming position.

The polarization beam splitter 250 changes paths of incident light such that light beams incident thereon from the illumination unit 200 are directed to the image forming device 400 and light beams incident thereon from the image forming device 400 are directed to the screen 500. In this manner, the projection-type image display apparatus can change paths of light beams using the light beam polarization converting unit 230 and the polarization beam splitter 250, thereby reducing optical loss caused during an optical path change.

The color prism 300 includes first through third triangular prisms 310, 320, and 330, and first through third dichroic filters 341, 343, and 345. Each of the first through third triangular prisms 310, 320, and 330 has two boundary surfaces, which are in contact with the other two triangular prisms, and an outer surface, which transmits or reflects incident light according to an incidence angle of the light. The first through third dichroic filters 341, 343, and 345 are respectively interposed among the boundary surfaces of the first through third triangular prisms 310, 320, and 330 to selectively transmit or reflect incident light according to wavelength. Accordingly, the color prism 300 can separate incident light with a polarization, which has been emitted from the light source 210 and has passed through the polarization beam splitter 250, into first through fourth light beams $L_1$, $L_2$, $L_3$, and $L_4$ according to wavelength ranges, and synthesizes first through fourth light beams $L_1$, $L_2$, $L_3$, and $L_4$ incident from the first through fourth image forming devices 410, 420, 430, and 440.

Since the color prism 300 is the same as the color prism 100 described with reference to FIGS. 2 through 5, a detailed explanation thereof will not be provided.

The image forming device 400 forms images using predetermined color beams separated and incident from the color prism 300, and reflects the formed images to the color prism 300. To this end, the image forming device 400 includes the first through fourth image forming devices 410, 420, 430, and 440 facing outer surfaces of the first through third triangular prisms 310, 320, and 330.

The first image forming device 410 faces the outer surface of the second triangular prism 320, and forms an image by selectively modulating the first light beam $L_1$ from the color prism 300 by pixels. The second and third image forming devices 420 and 430 face the outer surface of the third triangular prism 330, and form an image by selectively modulating the incident second and third light beams $L_2$ and $L_3$ by pixels. The fourth image forming device 440 faces the outer surface of the first triangular prism 310, and forms an image using the incident fourth light beam $L_4$. The image forming device 400 may be a reflective liquid crystal on silicon (LCOS) display or a digital micromirror device (DMD).

Figure 7:
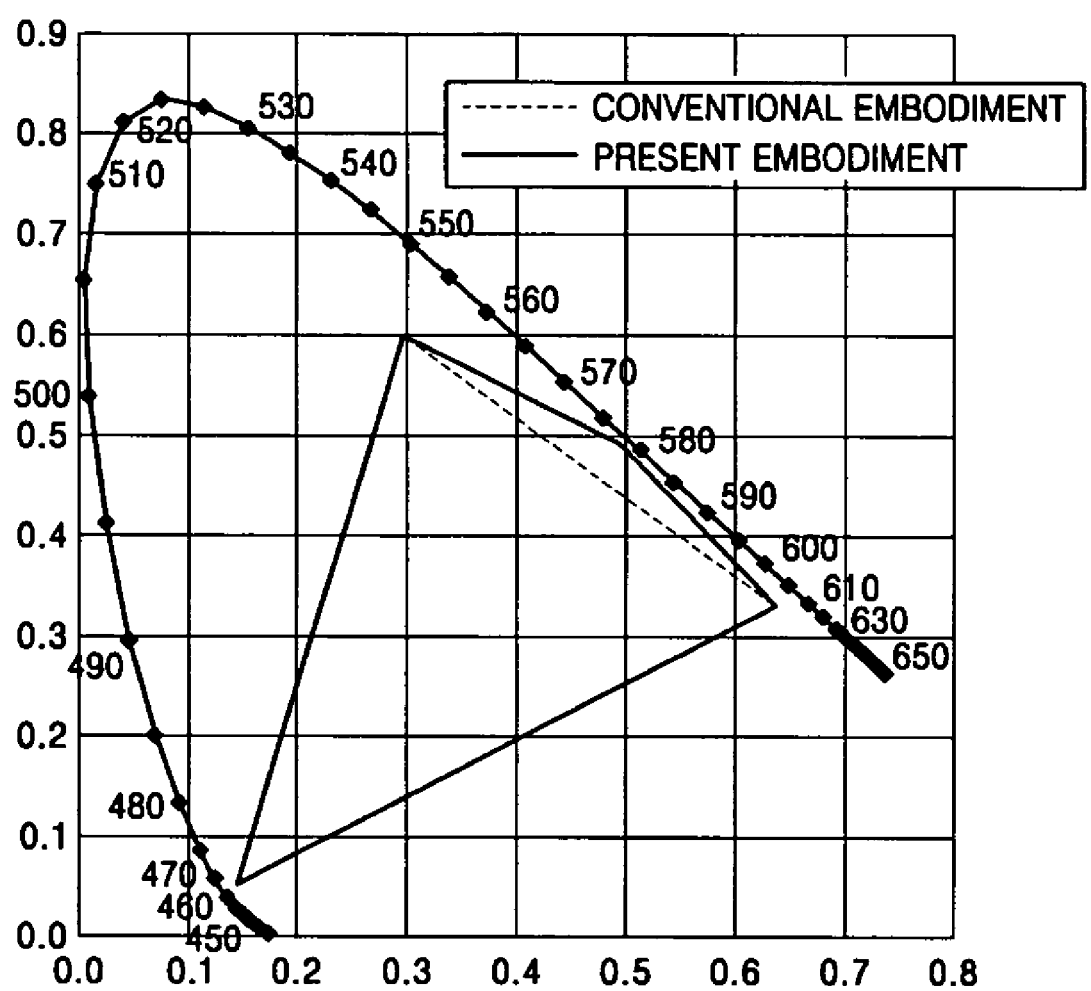
FIG. 7 is a graph illustrating a color gamut of light synthesized by the projection-type image display apparatus shown in FIG. 6.

As described above, the multi-panel projection-type image display apparatus can be easily realized by employing the color prism 300 to separate incident light into the first through fourth light beams $L_1$, $L_2$, $L_3$, and $L_4$ and positioning the first through fourth image forming devices 410, 420, 430, and 440 in the paths of the separated light beams to form images. In particular, since the four image forming devices 410, 420, 430, and 440 face the outer surfaces of the triangular prisms, respectively, the projection-type image display apparatus has a quadrilateral color gamut as shown in FIG. 7, which is larger than a conventional color gamut as shown in FIG. 1.

Referring to FIG. 6, the projection lens unit 500 faces the polarization beam splitter 250, and enlarges and projects an incident image formed by the image forming device 400 and passing through the color prism 300 and the polarization beam splitter 250 onto the screen 550.

The color prism constructed as above according to the present general inventive concept can separate incident white light into four-color beams and synthesize four kinds of wavelengths incident from different locations, thereby increasing a color gamut.

Furthermore, the projection-type image display apparatus can be made compact by employing the color prism and can increase a color gamut by employing the four image forming devices to form a color image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A color prism comprising:
    first through third triangular prisms each having two boundary surfaces, which face the other two triangular prisms, and an outer surface, which transmits or reflects incident light according to an incidence angle of the light; and
    first through third dichroic filters respectively interposed among the first through third triangular prisms and selectively transmits and reflects incident light according to wavelength to separate incident light into first through fourth light beams according to wavelength ranges and synthesize incident first through fourth light beams.

2. The color prism of claim 1, wherein the first through third triangular prisms have the same shape and size.

3. The color prism of claim 2, wherein each of the first through third triangular prisms is an isosceles triangular prism having an angle of 120° between the two boundary surfaces and an angle of 30° between each of the two boundary surfaces and the outer surface.

4. The color prism of claim 1, wherein:
    the first dichroic filter is interposed between the first triangular prism and the second triangular prism to transmit the first and second light beams and reflect the third and fourth light beams;
    the second dichroic filter is interposed between the second triangular prism and the third triangular prism to reflect the first light beam and transmit the second light beam; and
    the third dichroic filter is interposed between the first triangular prism and the third triangular prism to transmit the third light beam and reflect the fourth light beam.

5. The color prism of claim 4, wherein a part of the outer surface of each of the first and second triangular prisms is covered with a total reflection coating to reflect first, second, third, and fourth light beams, which are obliquely incident.

6. A projection-type image display apparatus comprising:
    a light source emitting light;
    a polarization beam splitter to transmit or reflect incident light according to a polarization direction;
    a color prism including first through third triangular prisms each having two boundary surfaces which face the other two triangular prisms, and an outer surface which transmits or reflects incident light according to an incidence angle of the light, and first through third dichroic filters respectively interposed among the first through third triangular prisms and selectively transmits or reflects incident light according to wavelength, to separate incident light emitted from the light source and passing through the polarization beam splitter into first through fourth light beams according to wavelength ranges;
    first through fourth image forming devices disposed to face the outer surfaces of the first through third triangular prisms, and selectively modulates incident first through fourth light beams by pixels to form images and reflects the formed images to the color prism; and
    a projection lens unit to enlarge and project an incident image formed by the first through fourth image forming devices and synthesized by the color prism onto a screen.

7. The projection-type image display apparatus of claim 6, wherein the first through third triangular prisms have the same shape and size.

8. The projection-type image display apparatus of claim 7, wherein each of the first through third triangular prisms is an isosceles triangular prism having an angle of 120° between the two boundary surfaces and an angle of 30° between each of the two boundary surfaces and the outer surface.

9. The projection-type image display apparatus of claim 6, wherein:
    the first dichroic filter is interposed between the first triangular prism and the second triangular prism to transmit the first and second light beams and reflect the third and fourth light beams;
    the second dichroic filter is interposed between the second triangular prism and the third triangular prism to reflect the first light beam and transmit the second light beam; and
    the third dichroic filter is interposed between the first triangular prism and the third triangular prism to transmit the third light beam and reflect the fourth light beam.

10. The projection-type image display apparatus of claim 9, wherein:
    the first image forming device faces the outer surface of the second triangular prism to form and reflect an image using an incident first light beam;
    the second image forming device faces the outer surface of the third triangular prism to form and reflect an image using an incident second light beam;
    the third image forming device faces the outer surface of the first triangular prism to form and reflect an image using an incident third light beam; and
    the fourth image forming device faces the outer surface of the third triangular prism to form and reflect an image using an incident fourth light beam.

11. The projection-type image display apparatus of claim 9, wherein a part of the outer surface of each of the first and second triangular prisms is covered with a total reflection coating to reflect first, second, third, and fourth light beams, which are obliquely incident.

12. The projection-type image display apparatus of claim 6, further comprising a light integrator interposed between the light source and the polarization beam splitter, and making the light beam emitted from the light source uniform.

13. The projection-type image display apparatus of claim 12, wherein the light integrator is a fly-eye lens including one or more lenses each having a plurality of convex or cylindrical lens cells that are arranged adjacent to one another.

14. The projection-type image display apparatus of claim 12, further comprising a polarization converting unit interposed between the light source and the polarization beam splitter, and changing a polarization direction of incident light and directing light with a specific polarization to the polarization beam splitter.

15. A color prism, comprising:
    five external surfaces forming a triangular cylinder shape, each external surface to transmit or reflect incident light depending on an incidence angle of the light; and dichroic filters dividing the prism into three portions, each dichroic filter to selectively transmit or reflect incident light according to wavelength to separate the incident light into first through fourth light beams according to wavelength ranges and synthesize incident first through fourth light beams.

16. The color prism of claim 15, wherein each of the three portions are equal in size and shape.

17. The color prism of claim 15, wherein a part of three of the four external surfaces of the prism is covered with a total reflection coating to reflect first, second, third, and fourth light beams, which are obliquely incident.

18. A projection-type image display apparatus comprising:
- a light source emitting light;
- a polarization beam splitter to transmit or reflect incident light according to a polarization direction;
- a color prism including five external surfaces forming a triangular cylinder shape, three of the five external surfaces to transmit or reflect incident light based on an incidence angle of the light, and dichroic filters dividing the prism into three portions, each dichroic filter to selectively transmit or reflect incident light according to wavelength to separate the incident light into first through fourth light beams according to wavelength ranges and synthesize incident first through fourth light beams;
- first through fourth image forming devices disposed to face the three external transmitting or reflecting surfaces of the prism and selectively modulate incident first through fourth light beams by pixels to form images and reflect the formed images to the color prism; and
- a projection lens unit to enlarge and project an incident image formed by the first through fourth image forming devices and synthesized by the color prism onto a screen.

19. The projection-type image display apparatus of claim 18, wherein each of the three portions are equal in size and shape.

20. The projection-type image display apparatus of claim 18, wherein:
- the first image forming device faces the second external surface of the prism to form and reflect an image using an incident first light beam;
- the second image forming device faces the third external surface of the prism to form and reflect an image using an incident second light beam;
- the third image forming device faces the first external surface of the prism to form and reflect an image using an incident third light beam; and
- the fourth image forming device faces the third outer surface of the prism to form and reflect an image using an incident fourth light beam.

* * * * *